US008634854B2

(12) United States Patent
Kim

(10) Patent No.: US 8,634,854 B2
(45) Date of Patent: Jan. 21, 2014

(54) METHOD AND APPARATUS FOR PROVIDING LOCATION INFORMATION OF DEVICE THROUGH HOME NETWORK

(75) Inventor: Joo-hyun Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 11/607,958

(22) Filed: Dec. 4, 2006

(65) Prior Publication Data

US 2007/0192813 A1  Aug. 16, 2007

(30) Foreign Application Priority Data

Feb. 13, 2006 (KR) ........................ 10-2006-0013702

(51) Int. Cl.
*H04W 24/00* (2009.01)
*H04W 4/00* (2009.01)
*G05B 11/01* (2006.01)
*H04H 20/71* (2008.01)
*H04H 60/09* (2008.01)
*H04H 40/00* (2008.01)

(52) U.S. Cl.
USPC .................... 455/456.2; 455/456.1; 455/3.01; 455/3.03; 455/3.04; 455/3.05; 370/338; 340/539.32; 700/19

(58) Field of Classification Search
USPC .............. 370/338; 455/3.01, 3.03, 3.04, 3.05, 455/3.06, 456.1, 41.2; 340/539.32; 709/19; 700/19
See application file for complete search history.

(56) References Cited

U.S. PATENT DOCUMENTS

| 2001/0029166 A1* | 10/2001 | Rune et al. ....................... 455/41 |
| 2003/0117966 A1* | 6/2003 | Chen .............................. 370/255 |
| 2004/0093274 A1* | 5/2004 | Vanska et al. .................... 705/26 |
| 2004/0192331 A1* | 9/2004 | Gorday et al. ............. 455/456.1 |
| 2004/0199272 A1 | 10/2004 | Yamamoto et al. |
| 2004/0203350 A1* | 10/2004 | Shultz et al. .................. 455/41.1 |
| 2004/0205172 A1* | 10/2004 | Kim .............................. 709/222 |
| 2005/0035846 A1* | 2/2005 | Zigmond et al. ............. 340/5.22 |
| 2005/0159823 A1* | 7/2005 | Hayes et al. .................... 700/19 |
| 2006/0112192 A1* | 5/2006 | Stewart et al. ................. 709/249 |
| 2006/0258289 A1* | 11/2006 | Dua .............................. 455/41.3 |

FOREIGN PATENT DOCUMENTS

| JP | 11-317756 A | 11/1999 |
| JP | 200337604 A | 2/2003 |
| JP | 2003177980 A | 6/2003 |
| JP | 2004-229310 A | 8/2004 |
| KR | 10-0432044 B1 | 5/2004 |
| KR | 10-0513851 B1 | 9/2005 |

OTHER PUBLICATIONS

Communication, dated Oct. 10, 2012, issued by the State Intellectual Property Office of the People's Republic of China in counterpart Chinese Patent Application No. 200710001986.4.

(Continued)

*Primary Examiner* — Opiribo Georgewill
(74) *Attorney, Agent, or Firm* — Sughrue Mion, PLLC

(57) ABSTRACT

A method and an apparatus for providing information of a device to other devices through the home network are provided. The method includes: generating relative location information indicating that a first device is present in a vicinity of a second device if a remote control signal for the second device is received; and providing the relative location information as location information of the first device to at least one other device belonging to the home network. Accordingly, the user can acquire location information of devices belonging to the home network. Therefore, it is possible to easily identify the correspondence of devices visually recognized by the user to the device list obtained as a result of the search.

13 Claims, 7 Drawing Sheets

(56) References Cited

OTHER PUBLICATIONS

Communication dated Jan. 7, 2013 from the State Intellectual Property Office of P.R. China in counterpart Chinese application No. 200710001986.4.

Communication, dated Mar. 7, 2012, issued by the State Intellectual Property Office of P.R. China in corresponding Chinese Application No. 200710001986.4.

Notice of Reasons for Rejection dated Sep. 6, 2011 from the Japanese Patent Office in counterpart Japanese application No. 2007-010710.

* cited by examiner

FIG. 2

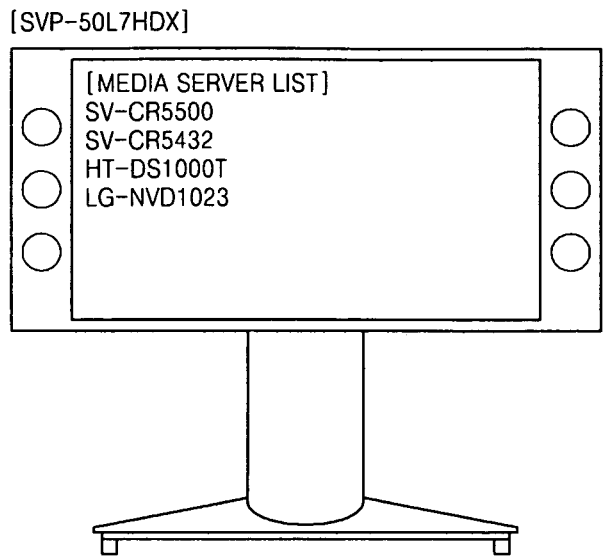

[SVP-50L7HDX]

[MEDIA SERVER LIST]
SV-CR5500
SV-CR5432
HT-DS1000T
LG-NVD1023

FIG. 3

```
- <stateVariable>
    <name>PageMargins</name>
    <sendEventsAttribute>no</sendEventsAttribute>
    <dataType>string</dataType>
  </stateVariable>
- <stateVariable>
    <name>PrinterLocation</name>
    <sendEventsAttribute>no</sendEventsAttribute>
    <dataType>string</dataType>
  </stateVariable>
- <stateVariable>
    <name>PrinterName</name>
    <sendEventsAttribute>no</sendEventsAttribute>
    <dataType>string</dataType>
  </stateVariable>
- <stateVariable>
    <name>PrintQuality</name>
    <sendEventsAttribute>no</sendEventsAttribute>
    <dataType>string</dataType>
```

METHOD AND APPARATUS FOR PROVIDING LOCATION INFORMATION OF DEVICE THROUGH HOME NETWORK

CROSS-REFERENCE TO RELATED PATENT APPLICATION

This application claims priority from Korean Patent Application No. 10-2006-0013702, filed on Feb. 13, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a home network, and more particularly, to providing information about a device to other devices through the home network.

2. Description of the Related Art

A Universal Plug and Play (UPnP) protocol has been widely used as a standard technology for a home network. However, since home network devices based on the UPnP protocol utilize an identifier (ID) system based on a Universally Unique ID (UUID) to recognize and identify each device on the home network, it is difficult for a user to exactly match devices shown in a list through the home network, with devices visually recognized by the user.

FIG. 1 shows a usage environment of a general home network. For example, in homes provided with the home network, a user can reproduce contents stored in a media server using a remote display apparatus by controlling the media server. In other words, the user can cause a digital versatile disk (DVD) player to reproduce a DVD title on a digital television (TV) using a remote controller by loading the DVD title into the DVD player. In order to reproduce the DVD title, the user should specify the digital TV, i.e., a media renderer, for reproducing the DVD title and the DVD player, i.e., a media server, for loading the DVD title.

More specifically, as shown in FIG. 1, in the home network environment, if the user turns on the digital TV in one room and loads the DVD title into the DVD player located adjacent to the digital TV and one or more DVD players exist in other rooms, the user should specify one DVD player among the plurality of DVD players.

FIG. 2 shows information formats of home network devices conventionally provided to a user in the home network environment. As shown in FIG. 2, information which can be obtained by the user searching for media servers in the home network is in the form of device IDs such as <SV-CR5500> or <SV-CR5432> which it is difficult to intuitively match with devices actually seen by the user.

The user cannot see the location information of the devices obtained as a result of the search. Accordingly, even if a device to be used is in the vicinity of the user, the user should know the ID of the device to be used among a number of device IDs. In the service description document for a UPnP Print Enhanced: 1 standard, as shown in FIG. 3, location information of printers in the network environment having the printers is provided in the description, but it is not clearly described how to provide the location information.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus for providing information about a device to other devices through the home network, in which the device detects its location information and provides the location information to a user, thereby allowing the user to detect the location of the device.

According to an aspect of the present invention, there is provided a method of providing device information through a home network, the method comprising: generating relative location information indicating that a device is present in the vicinity of another device if a remote control signal for another device is received; and providing the relative location information as location information of the device to one or more devices belonging to the home network.

The method may further include receiving absolute location information input by a user from another device; and providing the absolute location information as location information of the device to one or more devices belonging to the home network.

If the home network is based on a UPnP (universal Plug and Play) protocol, in the providing the relative location information, the relative location information may be inserted in a service description document and an <alive> message or a <M-Search> response message including a Uniform Resource Locator URL of the service description document may be transmitted. In addition, in the providing the relative location information, an <alive> message including a URL of a service description document having the absolute location information inserted therein may be received.

In addition, the remote control signal may be an Infrared Data Association (IrDA) signal.

According to another aspect of the present invention, there is provided a home network device, comprising: a location information generating unit which generates relative location information indicating that a device is present in the vicinity of another device if a remote control signal for another device is received through the home network; and a location information provider which provides the relative location information as location information of the device to one or more devices belonging to the home network.

BRIEF DESCRIPTION OF THE DRAWINGS

The above and other aspects of the present invention will become more apparent by describing in detail exemplary embodiments thereof with reference to the attached drawings in which:

FIG. 2 is a diagram showing information formats of home network devices conventionally provided to a user;

FIG. 3 is a diagram showing a service description document used in a UPNP PrintEnhanced: 1 standard;

DETAILED DESCRIPTION OF THE EXEMPLARY EMBODIMENTS OF THE INVENTION

Figure 1:
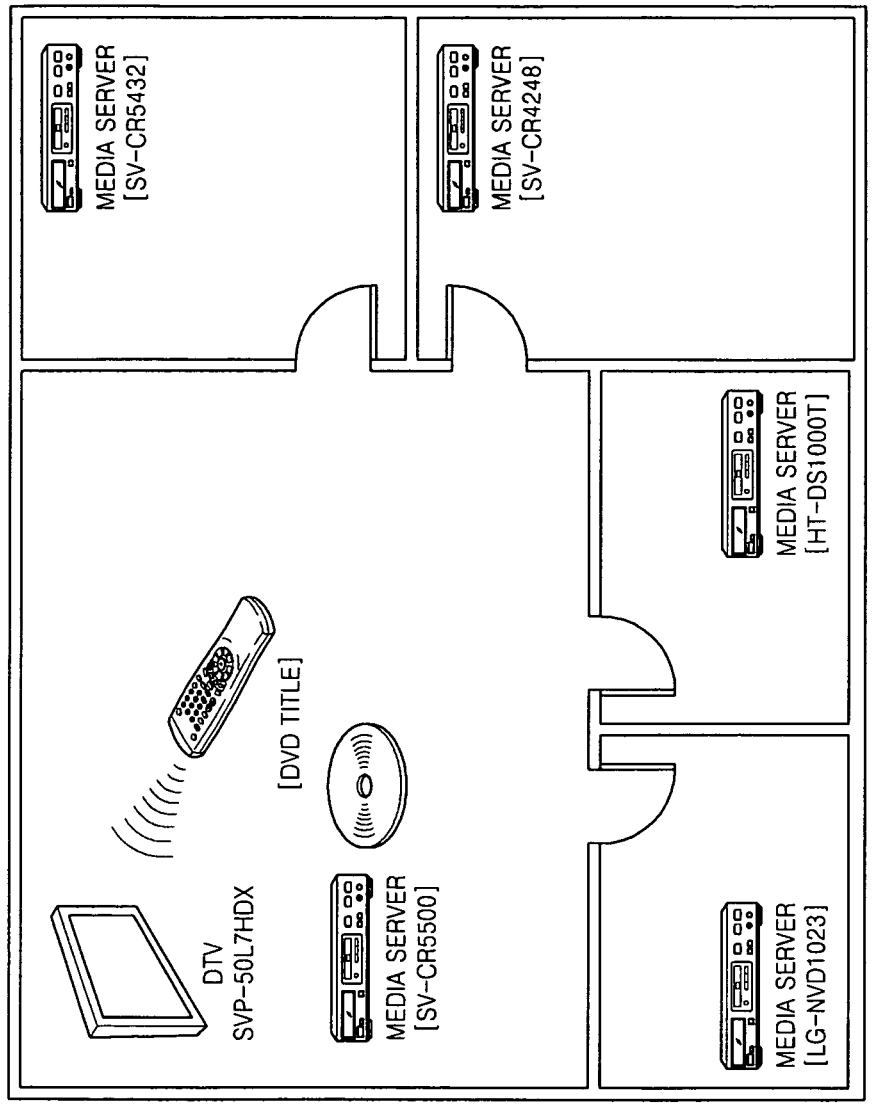
FIG. 1 is a diagram showing a usage environment of a general home network.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements.

Hereinafter, exemplary embodiments of the present invention will be described in detail with reference to the attached drawings.

Figure 4:
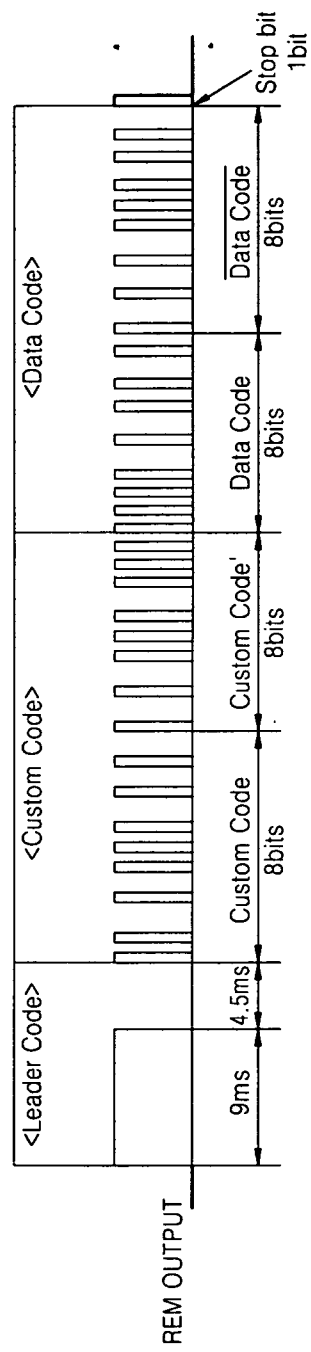
FIG. 4 is a diagram showing a format of a general infrared control signal.

FIG. 4 is a diagram showing a format of a general infrared control signal. As shown in FIG. 4, a general infrared control signal can be divided into a leader code, a custom code, and a data code. The leader code indicates the starting point of the infrared control signal. If a device recognizes the leader code, the device waits for the next signals. The custom code includes a call symbol for the device, and a device ID for identifying each device is inserted into the call symbol. The data code includes command information for each device. The above-mentioned codes are combined to form the infrared control signal for a general home electronic appliance.

If devices controlled by an infrared control signal are located in close range and a user sends the infrared control signal to any one of the devices using a remote controller, the infrared control signal is also sent to adjacent devices. Then, the adjacent devices analyze the pattern of the custom code included in the infrared control signal received. If it is determined that the infrared control signal is not destined for the adjacent devices, the adjacent devices ignore the infrared control signal. Adjacent devices can also receive the infrared control signal and be aware of the presence of other devices in close range by analyzing the pattern of the custom code, thereby enabling the devices in the home network to generate relative location information. The details thereof will be described below.

Figure 5:
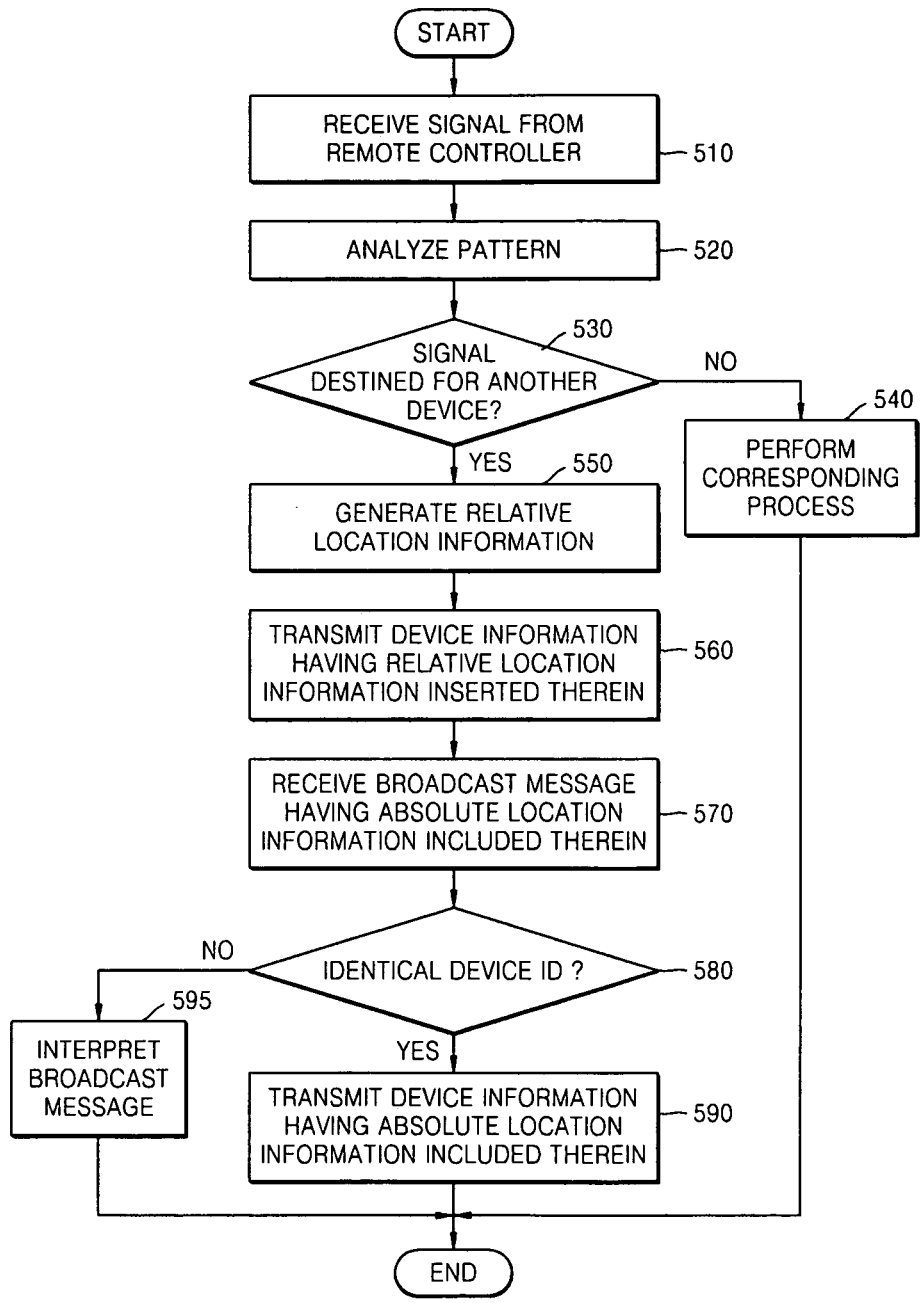
FIG. 5 is a flowchart of a method of providing location information of a device through a home network according to an exemplary embodiment of the present invention.

FIG. 5 is a flowchart of a method of providing location information of a device through a home network according to an exemplary embodiment of the present invention.

If a home network device A receives a signal, i.e., an infrared control signal from a remote controller (510), the device A analyzes the pattern of a custom code included in the infrared control signal (520) and determines the destination of the infrared control signal with reference to a device ID obtained from the analysis (530). If the device ID is identical to that of the device A, the device A performs a process defined in a data code included in the infrared control signal (540). In the present exemplary embodiment, the device ID is not limited to the information having a specific format, but may be interpreted to include any information for identifying each device. For example, a universally unique identifier (UUID) used in a universal Plug and Play (UPnP) protocol may be included in the device ID.

If it is determined from the analysis of the custom code that the received infrared control signal is a signal destined not for the device A but for a device B, the device A thereby perceives the presence of the device B in the vicinity of the device A, generates information indicating a relative location (550), and provides device information of the device A with the relative location information inserted therein to other devices (560). In this case, the device information is a message transmitted if a device belonging to the home network provides information about the device to other devices on the same network. In a UPNP based home network, a service description document corresponds to the device information. More particularly, the relative location information is inserted into the service description document and a uniform resource locator (URL) of the service description document is included in a <M-Search> response message or in an <alive> message and transmitted from the device. As a result, through the aforementioned processes, all the devices on the home network can include their location information in their device information to be transmitted through a network.

The user can be aware of only relative location information of each device through the processes which end at operation 560, but the user will be able to know absolute location information of each device through processes starting from operation 570. In this case, the absolute location information refers to location information, such as "a living room", "a master room", or the like, which can be described regardless of the location information of other devices. In order for this to happen, the user has to input absolute location information of one or more devices.

For example, if the device A and the device B are located in the living room and the user has input "a living room" as absolute location information of the device B, the device B periodically broadcasts a broadcast message including the absolute location information to the home network. In this case, the broadcast message is a message periodically broadcasted in order to inform the presence of the home network device on the network and may have other names depending on the network.

If the device A receives a broadcast message from the device B (570), the device A determines whether the sending device for the broadcast message is the device B by using the device ID recognized from the broadcast message (580). If it is determined that the recognized device ID is the device B from the analysis of the broadcast message, the device A inserts absolute location information included in the broadcast message in its device information and transmits the device information (590). In the present exemplary embodiment, the device information is the same as that described above. Since the device A has already perceived the presence of the device B in the vicinity of the device A and the device B has "a living room" as absolute location information of the device B, the device A may conclude that the device A is located in the living room where the device B is also located. However, the reason for determining whether the sending device of the broadcast message is the device B in operation 580 is because exact location information of a device is not reflected in the device information of the device if the absolute location information included in the received broadcast message is unconditionally accepted without performing the determining process.

If the device ID included in the received broadcast message is not identical to that of the device B, the broadcast message is interpreted in accordance with general processes.

According to the aforementioned processes, since devices in the home network can include absolute location information of the devices and/or relative location information in their device information, the user can determine locations of the devices from the device information obtained through the search of the devices in the home network for their device information.

Figure 6:
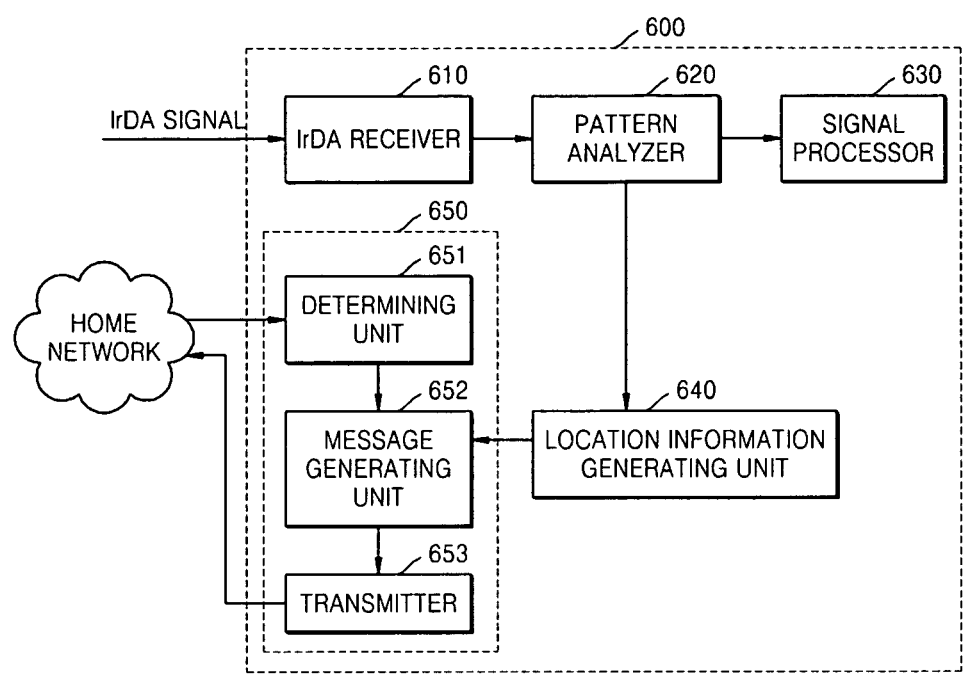
FIG. 6 is a block diagram showing a structure of a home network device according to an exemplary embodiment of the present invention.

FIG. 6 is a block diagram showing a structure of a home network device according to an exemplary embodiment of the present invention. In the present exemplary embodiment, it is assumed that the home network utilizes a UPnP protocol.

As shown in FIG. 6, the home network device 600 includes an infrared data association (IrDA) receiver 610, a pattern analyzer 620, a signal processor 630, a location information generating unit 640, and a location information provider 650.

The IrDA receiver 610 receives an infrared control signal transmitted from a user using a remote controller. The pattern analyzer 620 analyzes the pattern of a custom code included in the received infrared control signal and determines a destination device to be controlled by the received signal. If the received signal is a control signal for controlling a device 600, the signal processor 630 performs instructions included in the data code. If it is determined by the pattern analyzer 620 that the received signal is a control signal for controlling other devices, the location information generating unit 640 generates relative location information indicating that other devices are present in the vicinity of the device 600.

The location information provider 650 includes a determining unit 651, a message generating unit 652, and a transmitter 653. The message generating unit 652 generates a response message for responding to an <M-Search> command or an <alive> message by including the relative location information generated by the location information generating unit 640 in the response message. The transmitter 653 transmits the message generated by the message generating unit 652 through the home network. As described above, the relative location information is reflected in the service description document, and the in a <M-Search> response message or the <alive> message may include the URL of the service description document having the relative location information reflected therein.

As described above, in the case of absolute location information input by a user, the absolute location information is provided by using the <alive> messages of other devices. Similar to the relative location information, the absolute location information will be reflected in the service description document and the URL of the service description document will be included in the <alive> message. The determining unit 651 determines whether the sending device for the <alive> message is the device that has pre-provided, the relative location information with reference to the device ID included in the <alive> message received. In some cases, there may be a plurality of devices that have pre-provided the relative location information.

If it is determined by the determining unit 651 that the sending device for the <alive> message has already provided the relative location information to the device 600, the message generating unit 652 inserts the absolute location information acquired through the received alive> message in the service description document of the device 600 and thereafter generates a <M-Search> response message or an <alive> message, including the URL of the service description document. The transmitter 653 transmits the generated message to other devices belonging to the home network.

Figure 7A:
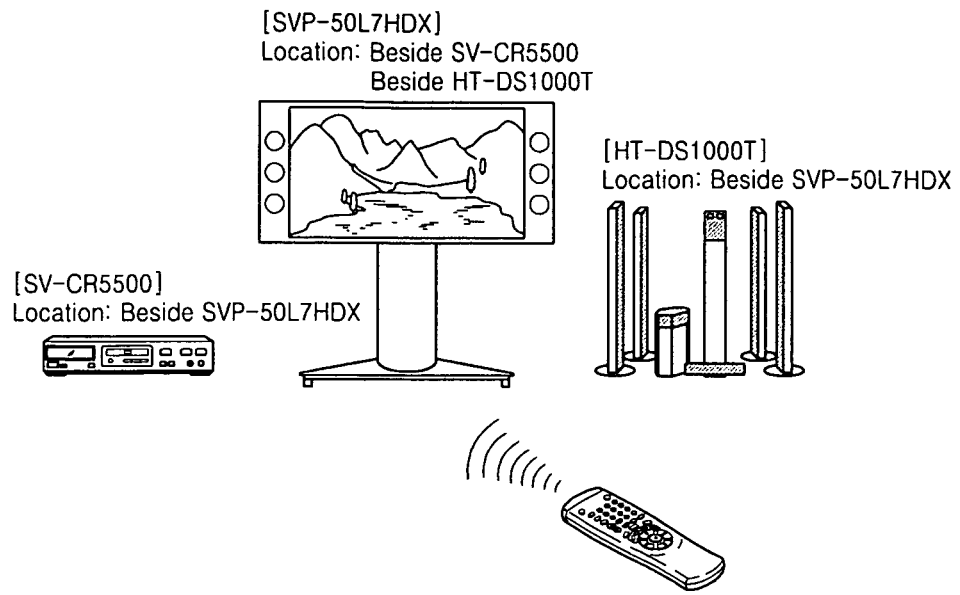
FIGS. 7A to 7C are schematic diagrams showing device location information formats provided to a user through a home network according to an exemplary embodiment of the present invention.
Figure 7B:
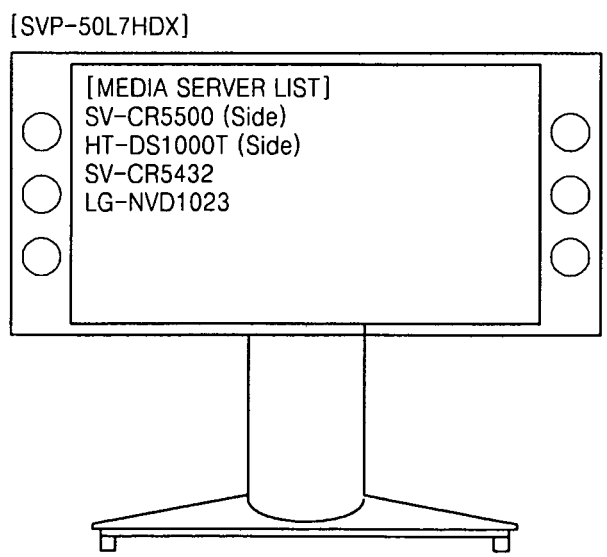
Figure 7C:
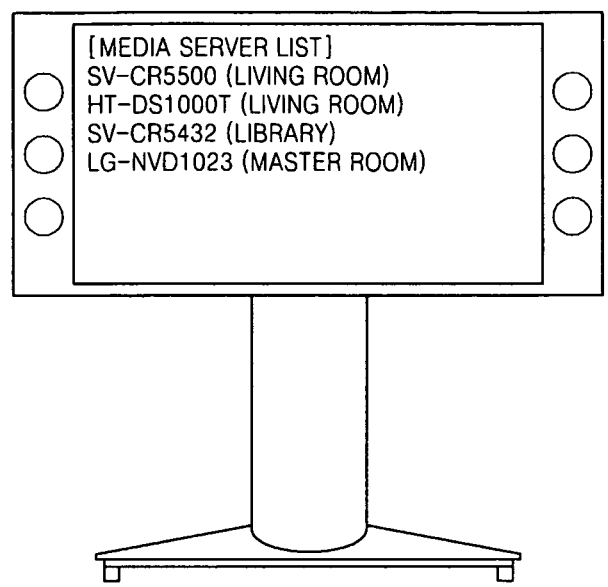

FIGS. 7A to 7C are schematic diagrams showing a format of device location information provided to a user through a home network according to an exemplary embodiment of the present invention. FIG. 7A illustrates a home network environment according to an exemplary embodiment of the present exemplary embodiment in which three home network devices are located in close vicinity to each other, as depicted in the figure. If a user transmits an infrared control signal to a device, denoted by SVP-50L7HDX located at a center of a home network, by using a remote controller, devices located on both sides with respect to the center device also receive the infrared control signal and analyze a custom code included in the infrared control signal, thereby detecting the presence of the SVP-50L7HDX device in their vicinity. Therefore, if the user searches the home network by using the SVP-50L7HDX device, a list having the format as shown in FIG. 7B will be displayed on a screen. In other words, since the devices located on both sides of the SVP-50L7HDX device provide relative location information indicating that the devices are present in the vicinity of the SVP-50L7HDX device in response to the search, together with their device information, it is possible to easily identify the correspondence of devices located adjacent to the device operated by the user to the device ID list obtained as a result of the search.

More specifically, assuming that the network environment shown in FIG. 7A corresponds to a living room and the user has input "a living room" as absolute location information for the SVP-50L7HDX device, devices on both sides having received a broadcast message (an <alive> message in a UPNP protocol) of the SVP-50L7HDX device may synchronize their absolute location information with that of the SVP-50L7HDX device. Accordingly, a device search result as shown in FIG. 7C will be displayed on the screen.

The exemplary embodiments of the present invention can be written as computer programs and can be implemented in general-use digital computers that execute the programs using a computer readable recording medium. Examples of the computer readable recording medium include magnetic storage media (e.g., ROM, floppy discs, hard discs, etc.) and optical recording media (e.g., CD-ROMs, or DVDs).

According to the present invention, since the user can acquire location information of devices belonging to a home network, it is possible to easily identify the correspondence of devices visually recognized by the user to the device list obtained as a result of the search.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope should be construed as being included in the present invention.

What is claimed is:

1. A method of providing device information through a home network, the method comprising:
   generating, by a first device, relative location information indicating that the first device is present in a vicinity of a second device when a remote control signal for the second device is received by the first device;
   providing, by the first device, the relative location information as location information of the first device through the home network to at least one other device belonging to the home network,
   receiving, at the first device, absolute location information from the second device; and
   providing, by the first device, the absolute location information as location information of the first device through the home network to the at least one other device belonging to the home network, wherein the remote control signal is generated for a purpose of controlling the second device exclusively, and wherein the first device and the second device are located close enough to each other to receive the remote control signal together.

2. The method of claim 1, wherein the remote control signal comprises an Infrared Data Association (IrDA) signal.

3. The method of claim 1, wherein the home network is based on a Universal Plug and Play (UPnP) protocol, and wherein in the providing the relative location information, the relative location information is inserted in a service description document and an <alive> message or a <M-Search> response message including a Uniform Resource Locator (URL) of the service description document is transmitted.

4. The method of claim 1, wherein the home network is based on a Universal Plug and Play (UPnP) protocol, and wherein in the receiving the absolute location information, an <alive> message including a Uniform Resource Locator (URL) of a service description document having the absolute location information inserted therein is received.

5. The method of claim 1, wherein the home network is based on a Universal Plug and Play (UPnP) protocol, and wherein in the providing the absolute location information, the absolute location information is inserted in a service description document and an <alive> message or a <M-Search> response message including a Uniform Resource Locator (URL) of the service description document is transmitted.

6. A non-transitory computer-readable medium having stored thereon a computer program for executing a method comprising:

generating, by a first device, relative location information indicating that the first device is present in a vicinity of a second device when a remote control signal for the second device is received;

providing, by the first device, the relative location information as location information of the first device through a home network to at least one other device belonging to the home network;

receiving, at the first device, absolute location information from the second device; and providing, by the first device, the absolute location information as location information of the first device through the home network to the at least one other device belonging to the home network wherein the remote control signal is generated for a purpose of controlling the second device exclusively, and wherein the first device and the second device are located close enough to each other to receive the remote control signal together.

7. A home network device comprising:

a location information generating unit which generates relative location information indicating that a first device is present in a vicinity of a second device when a remote control signal for the second device is received by the first device through a home network comprising a plurality of devices; and a location information provider which provides the relative location information as location information of the first device through the home network to at least one other device belonging to the home network, receives absolute location information input by a user from the second device and provides the absolute location information as location information of the first device to the at least one other device belonging to the home network, wherein the remote control signal is generated for a purpose of controlling the second device exclusively, and wherein the first device and the second device are located close enough to each other to receive the remote control signal together.

8. The device of claim 7, wherein the remote control signal comprises an Infrared Data Association (IrDA) signal.

9. The device of claim 7, wherein the home network is based on a Universal Plug and Play (UPnP) protocol, and wherein the location information provider inserts the relative location information in a service description document and transmits an <alive> message or a <M-Search> response message including a Uniform Resource Locator (URL) of the service description document.

10. The device of claim 7, wherein the home network is based on a Universal Plug and Play (UPnP) protocol, and wherein the location information provider is provided with the absolute location information by receiving an <alive> message including a Uniform Resource Locator (URL) of a service description document having the absolute location information inserted therein.

11. The device of claim 7, wherein the home network is based on a Universal Plug and Play (UPnP) protocol, and wherein the location information provider is provided with the absolute location information by inserting the absolute location information in a service description document and transmitting an <alive> message or a <M-Search> response message including a Uniform Resource Locator (URL) of the service description document.

12. The device of claim 10, wherein the location information provider comprises:

a determining unit which determines whether the <alive> message originated from a device of the plurality of devices which pre-provided the relative location information;

a message generating unit which generates a response message for responding to an <M-Search> command or the <alive> message by including the relative location information in the response message; and a transmitter which transmits the response message through the home network.

13. The method of claim 1, wherein the relative location information received by the at least one other device in the home network notifies the at least one other device that the first device is located in the vicinity of the second device.

* * * * *